(12) United States Patent
Sung et al.

(10) Patent No.: US 11,345,238 B2
(45) Date of Patent: May 31, 2022

(54) VEHICLE FUNCTION CONTROL APPARATUS AND METHOD USING A DETACHABLE KNOB

(71) Applicants: HYUNDAI MOTOR COMPANY, Seoul (KR); KIA MOTORS CORPORATION, Seoul (KR)

(72) Inventors: Si Hoon Sung, Suwon-si (KR); Jae Hoon Chung, Hwaseong-si (KR); Sung Un Kim, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 9 days.

(21) Appl. No.: 16/933,306

(22) Filed: Jul. 20, 2020

(65) Prior Publication Data

US 2021/0039496 A1 Feb. 11, 2021

(30) Foreign Application Priority Data

Aug. 7, 2019 (KR) .......................... 10-2019-0096206

(51) Int. Cl.
*B60K 37/06* (2006.01)
*G06F 3/16* (2006.01)
*G10L 15/22* (2006.01)

(52) U.S. Cl.
CPC .............. *B60K 37/06* (2013.01); *G06F 3/167* (2013.01); *G10L 15/22* (2013.01); *B60K 2370/122* (2019.05); *B60K 2370/126* (2019.05); *B60K 2370/148* (2019.05); *G10L 2015/223* (2013.01)

(58) Field of Classification Search
CPC ... G10L 15/22; G10L 2015/223; G06F 3/167; B60K 37/06; B60K 2370/1446; B60K 2370/828; B60K 2370/126; B60K 2370/122; B60K 2370/148
See application file for complete search history.

(56) References Cited

U.S. PATENT DOCUMENTS

2018/0154774 A1* 6/2018 Park ................... G02B 27/0101
2020/0164835 A1* 5/2020 Chung ..................... B60R 25/24

FOREIGN PATENT DOCUMENTS

KR 20180064968 A 6/2018

* cited by examiner

*Primary Examiner* — Christopher E Leiby
(74) *Attorney, Agent, or Firm* — Lempia Summerfield Katz LLC

(57) ABSTRACT

A vehicle function control apparatus and method use a detachable knob. The vehicle function control method includes determining, by an integrated manipulation unit, a target attachment position on an attachment unit having a plurality of attachment positions, sensing the position of a detachable knob having at least one magnet and a manipulation means on the attachment unit, and controlling a plurality of electromagnets disposed so as to correspond to the plurality of attachment positions such that the detachable knob is moved from the sensed position to the target attachment position, among the plurality of attachment positions.

15 Claims, 16 Drawing Sheets

FIG. 2(a)
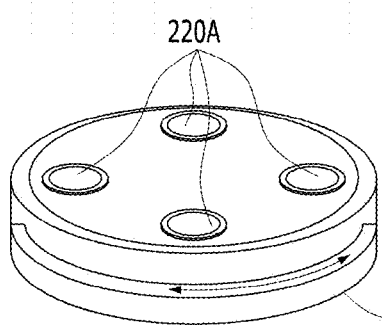
FIG. 2(b)
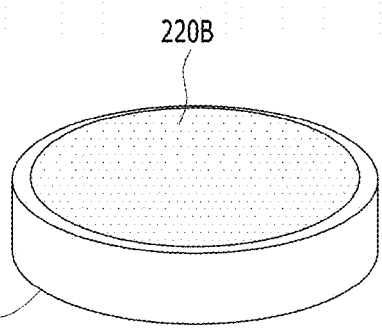
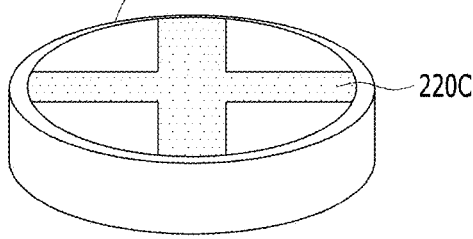
FIG. 2(c)

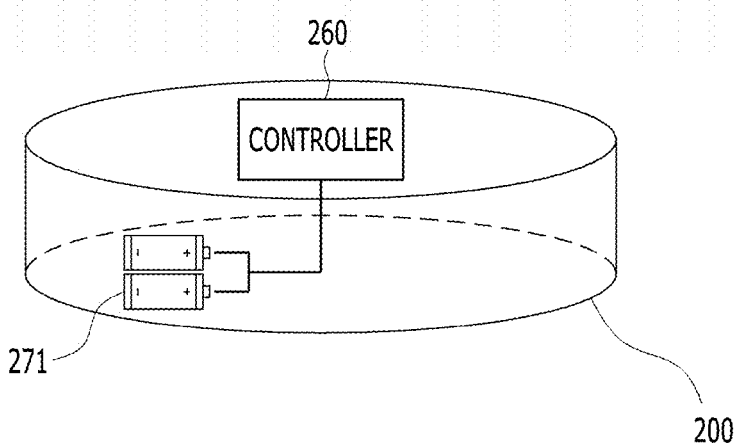
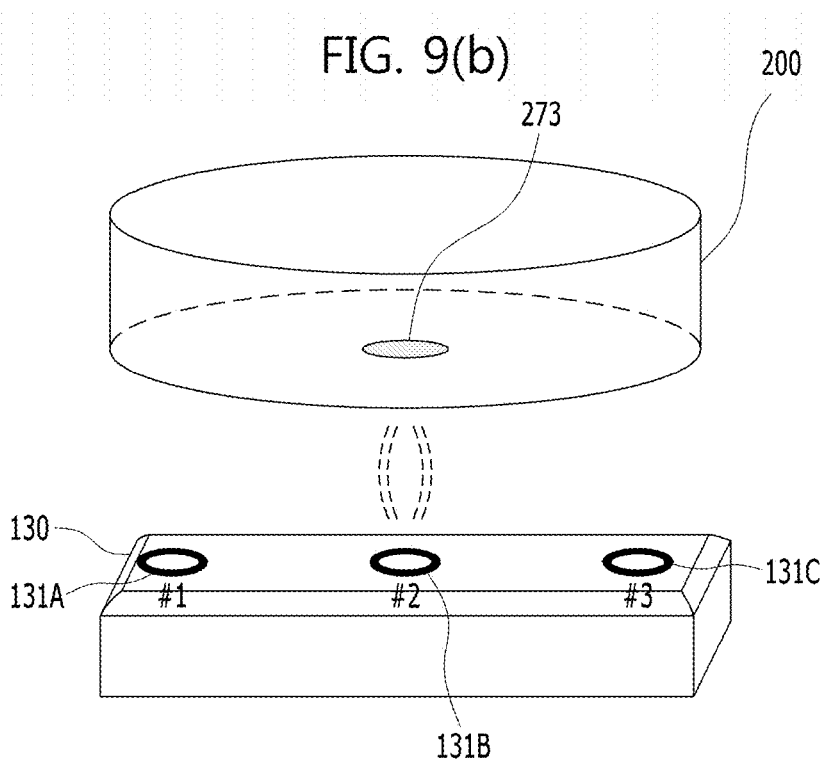

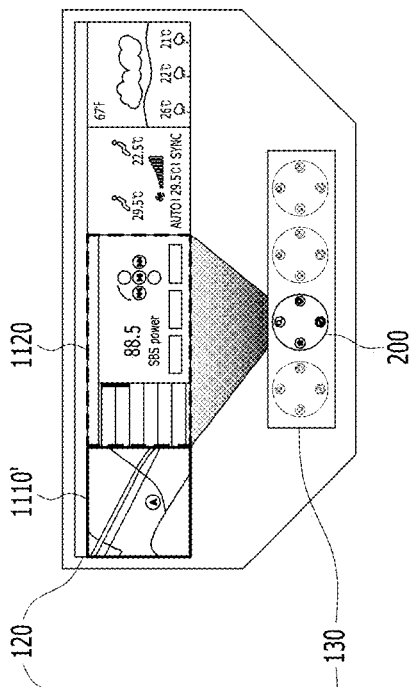
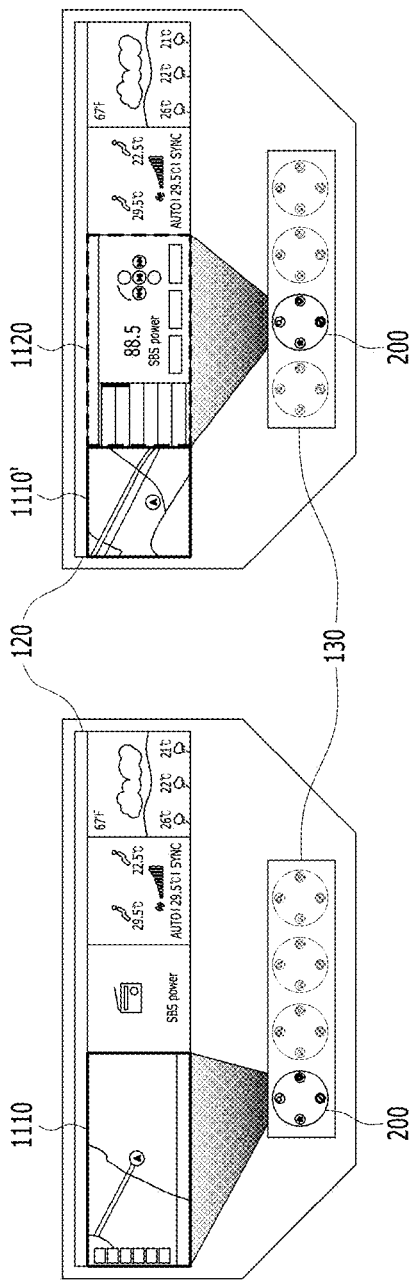
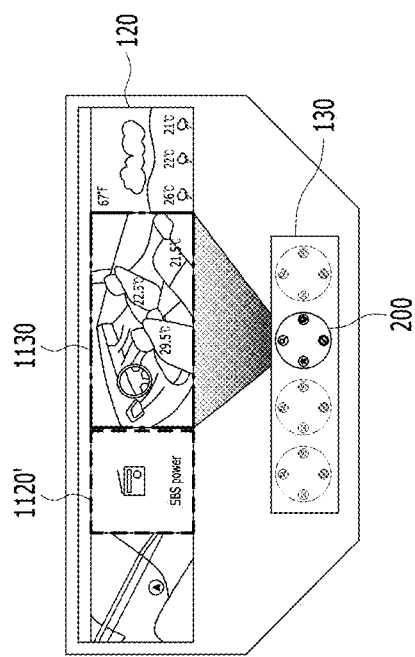

VEHICLE FUNCTION CONTROL APPARATUS AND METHOD USING A DETACHABLE KNOB

This application claims the benefit of priority to Korean Patent Application No. 10-2019-0096206, filed on Aug. 7, 2019, the entire content of which is hereby incorporated by reference as if fully set forth herein.

BACKGROUND

Field of the Disclosure

The present disclosure relates to a user interface capable of controlling various functions in a vehicle, and more particularly to a vehicle function control apparatus and method using a detachable knob.

Discussion of the Related Art

Vehicles brought out in recent years are equipped with various kinds of electronic equipment and thus functions that can be controlled by users become diversified in terms of kind and range. As a result, a manipulation system, such as a knob, is complicated, and the amount of information to be displayed at the same time is increased. Due to such a trend, the size of a display, which displays the operation state of a vehicle, multimedia, navigation information, and the like, has been gradually increased, and the demand for watching content during movement may be increased in an autonomous vehicle that will be brought out in the future, since a driver does not need to drive. Consequently, it is expected that the size of the display provided in the vehicle will be further increased.

Generally, in order to control a function to be controlled displayed on the display, a central-control-point (CCP)-based tree menu structure is used, and some vehicles provide a speech recognition function. In the CCP-based manipulation scheme, however, manipulation steps (depth) are large in number and thus complicated depending on the function to be controlled. In speech recognition, manipulation steps are relatively simple, but the frequency of use is considerably reduced when there is a passenger.

Therefore, there is a need for a vehicle function control apparatus capable of more intuitively using various functions of a display in consideration of a trend in which the display has a large size.

SUMMARY

Accordingly, the present disclosure is directed to a vehicle function control apparatus and method using a detachable knob that substantially obviate one or more problems due to limitations and disadvantages of the related art.

An object of the present disclosure is to provide a vehicle function control apparatus and method with improved convenience.

Another object of the present disclosure is to provide a vehicle function control apparatus and method capable of controlling various vehicle functions using a detachable knob.

Objects of the present disclosure devised to solve the problems are not limited to the aforementioned object. Other unmentioned objects should be clearly understood by those having ordinary skill in the art based on the following detailed description of the present disclosure.

To achieve these objects and other advantages and in accordance with the purpose of the present disclosure, as embodied and broadly described herein, a vehicle function control method uses a detachable knob. The method includes determining, by an integrated manipulation unit, a target attachment position on an attachment unit having a plurality of attachment positions. The method further comprises sensing the position of a detachable knob having at least one magnet and a manipulation means on the attachment unit. The method further comprises controlling a plurality of electromagnets disposed so as to correspond to the plurality of attachment positions such that the detachable knob is moved from the sensed position to the target attachment position, among the plurality of attachment positions.

In another aspect of the present disclosure, a vehicle function control apparatus includes a detachable knob having at least one magnet and includes a manipulation means and an integrated manipulation unit configured to sense a target attachment position on an attachment unit having a plurality of attachment positions. The integrated manipulation unit is further configured to sense the position of the detachable knob on the attachment unit, and to control a plurality of electromagnets disposed so as to correspond to the plurality of attachment positions such that the detachable knob is moved from the sensed position to the target attachment position, among the plurality of attachment positions.

It should be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and, together with the description, serve to explain the principle of the disclosure. In the drawings:

FIGS. 2(a), (b), and (c) are views illustrating the external appearance of a detachable knob according to an embodiment of the present disclosure;

FIGS. 9(a) and 9(b) are views showing an example of the construction of a power supply of the detachable knob according to the embodiment of the present disclosure;

FIGS. 13(a)-13(c) are views showing an example of the form in which an interworking function is performed between the detachable knob and a display of the integrated manipulation unit according to the embodiment of the present disclosure;

DETAILED DESCRIPTION

Figure 1:
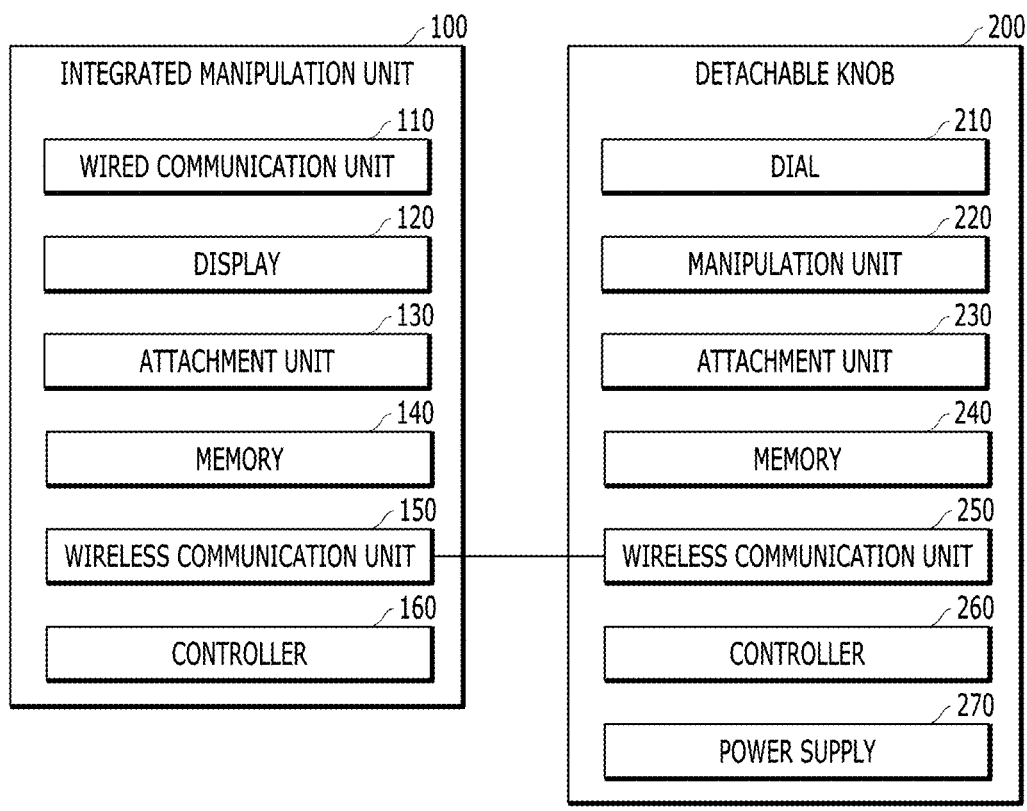
FIG. 1 is a view showing an example of the structure of a vehicle function control system including a detachable knob according to an embodiment of the present disclosure.

Reference is now made in detail to the embodiments of the present disclosure, examples of which are illustrated in the accompanying drawings. The following embodiments are given by way of example in order to enable those having ordinary skill in the art to fully understand the idea of the present disclosure. Therefore, the present disclosure is not limited by the following embodiments and may be realized in various other forms. In order to clearly describe the present disclosure, parts having no relation with the description of the present disclosure have been omitted from the drawings. Wherever possible, the same reference numerals are used throughout the specification to refer to the same or equivalent parts.

The term "comprises" or "includes" used herein should be interpreted not to exclude other elements but to further include such other elements, unless mentioned otherwise. In addition, the same reference numerals denote the same or equivalent constituent elements throughout the specification. When a component, device, element, or the like of the present disclosure is described as having a purpose or performing an operation, function, or the like, the component, device, or element should be considered herein as being "configured to" meet that purpose or to perform that operation or function. Further, the controller described herein may include a processor programmed to perform the noted operation, function, operation, or the like.

In an embodiment of the present disclosure, controlling various vehicle functions in the case in which a detachable knob having a display is attached to a predetermined point in a vehicle in controlling vehicle functions is proposed.

First, the structure of a vehicle function control system including a detachable knob, which may be applied to embodiments of the present disclosure, is described with reference to FIG. 1. FIG. 1 is a view showing an example of the structure of a vehicle function control system including a detachable knob according to an embodiment of the present disclosure.

Referring to FIG. 1, the vehicle function control system according to the embodiment of the present disclosure may include an integrated manipulation unit 100 and a detachable knob 200.

The integrated manipulation unit 100 may include a wired communication unit 110, a display 120, an attachment unit 130, a memory 140, a wireless communication unit 150, and a controller 160. Hereinafter, respective components is described in detail.

The wired communication unit 110 may exchange data with a control device in charge of each of at least a plurality of functions to be controlled in a vehicle. For example, the wired communication unit 110 may support at least one of vehicle communication schemes, such as CAN, CAN-FD, LIN, or Ethernet. In another example, the wired communication unit 110 may receive operation state information from an air conditioning control device for controlling an air conditioning function, a body control device in charge of a convenience function, such as a seat, and an audio/video/navigation (AVN) system, and may transmit a control command thereto.

The display 120 serves to visually output the operation state of the vehicle or various kinds of information necessary for a driver, such as a navigation guidance screen, operation state information of an air conditioning system, and reproduction state information of a multimedia function. In the case in which the display is configured as a touchscreen, the display may display a virtual knob for controlling at least some functions and may sense a touch command input through the virtual knob.

The attachment unit 130 may sense whether the detachable knob 200, a description of which is discussed below, is attached or detached. For example, the attachment unit 130 may include at least one of a Hall sensor for detecting magnetic force, a near-field communication (NFC) transceiver for performing NFC communication, a wireless charging transmitter for sensing a wireless charging receiver, a light receiver for recognizing a specific light emission pattern, or a capacitance sensor for sensing a change in capacitance. In other words, in the case in which the detachable knob 200 is provided with a permanent magnet, the detachable knob 200 may be sensed by the Hall sensor. In the case in which the detachable knob 200 is provided with an NFC tag, the detachable knob 200 may be sensed by the NFC transceiver. In the case in which the detachable knob 200 is provided with a wireless charging receiver, the detachable knob 200 may be sensed by the wireless charging transmitter. Of course, these sensing means are illustrative, and the present disclosure is not limited thereto. In addition, the attachment unit 130 may include an attachment means for fixing the detachable knob 200 to one or more predetermined attachment positions. For example, the attachment means may include a plurality of permanent magnets or electromagnets disposed so as to have a predetermined pattern. In this embodiment, the detachable knob 200 is provided with at least permanent magnets so as to correspond to the construction of the attachment unit 130. This is described in detail with reference to FIGS. 3-7(e).

The memory 140 may store an operating system for driving the integrated manipulation unit 100, various application programs configured to be operated in the operating system, multimedia content, input/output control information, and the like.

The wireless communication unit 150 may be connected to at least a wireless communication unit 250 of the detachable knob 200 using a short range communication protocol (e.g. Bluetooth, Wi-Fi, ZigBee, or NFC), a 3/4/5G protocol, etc. to exchange data. Of course, the wireless communication unit 150 may communicate with another component in the vehicle, such as the AVN system, in some embodiments.

The controller 160 may perform overall control of the respective components described above. The controller 160 may perform determination and calculation necessary to control a function to be controlled through interworking with the detachable knob 200 according to embodiments of the present disclosure described below.

Meanwhile, the detachable knob 200 may include a dial (or a wheel) 210, a manipulation unit 220, an attachment unit 230, a memory 240, a wireless communication unit 250, a controller 260, and a power supply 270. The construction of the dial 210 and the manipulation unit 220 is described below with reference to FIGS. 2(a)-2(c), and the construction of the attachment unit 230 is also described below in detail with reference to FIGS. 3-8(c).

The memory 240 may store an operating system for driving the detachable knob 200, identification information by function to be controlled, input/output control information of the detachable knob 200, and the like.

The wireless communication unit 250 may be connected to at least the wireless communication unit 150 of the integrated manipulation unit 100 using a short range communication protocol (e.g. Bluetooth, Wi-Fi, ZigBee, or NFC), a 3/4/5G protocol, etc. to exchange data. Of course, the wireless communication unit 250 may be configured to communicate with a telematics server or another smart device (e.g. a smartphone or a tablet) in some embodiments.

The controller 160 may perform overall control of the other components. The controller 160 may perform determination and calculation necessary to control a function to be controlled through interworking with the integrated manipulation unit 100 according to embodiments of the present disclosure described below.

FIGS. 2(a)-2(c) are views illustrating the external appearance of a detachable knob according to an embodiment of the present disclosure.

Referring to FIGS. 2(a)-2(c), the detachable knob 200 according to the embodiment of the present disclosure may have a cylindrical external appearance. Specifically, the detachable knob 200 may be configured in a form in which a toroidal or ring-shaped dial 210 wraps a circular top thereof.

The dial 210 may be configured to be rotatable along the outer circumferential surface of the detachable knob 200 in the clockwise direction or in the counterclockwise direction. The dial 210 may include a wheel encoder capable of sensing at least the rotation direction and the degree of rotation (e.g. displacement or angle) when a user rotates the dial while holding the dial. Of course, this is illustrative, and the present disclosure is not limited to a specific means or method for sensing rotation.

The manipulation unit 220 may be disposed at the top of the detachable knob. The manipulation unit 220 may be constituted of or comprise a plurality of key buttons 220A disposed so as to be spaced apart from each other in a predetermined pattern, as shown in FIG. 2(a). In another embodiment, the manipulation unit 220 may be constituted of or comprise a circular touch pad 220B disposed so as to occupy a major portion of the top, as shown in FIG. 2(b). In another embodiment, the manipulation unit 220 may be constituted of or comprise a touch sensor 220C having a predetermined form, as shown in FIG. 2(c). Here, each of the plurality of key buttons 220A may be a push button or a touch button. Also, in the case in which the manipulation unit 220 is constituted of or comprise a circular touch pad 220B, as shown in FIG. 2(b), a command may be input through writing recognition.

Next, the construction of the attachment unit 130 of the integrated manipulation unit 100 and the construction of the attachment unit 230 of the detachable knob 200 are described in connection with an attachment method and an attachment position recognition method with reference to FIGS. 3-8(c).

Figure 3:
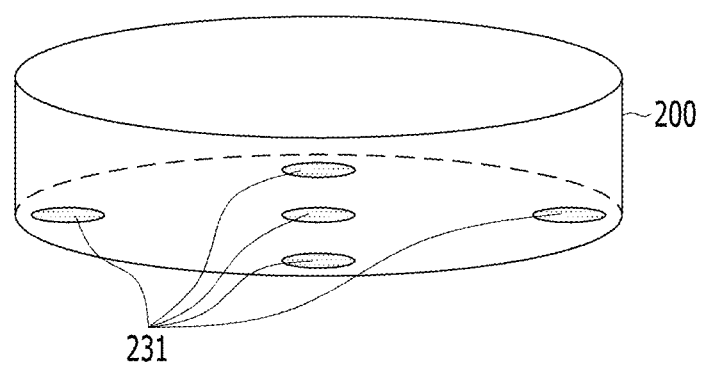
FIG. 3 is a view showing an example of the construction of an attachment unit of the detachable knob according to the embodiment of the present disclosure.

FIG. 3 is a view showing an example of the construction of the attachment unit of the detachable knob according to the embodiment of the present disclosure.

Referring to FIG. 3, the attachment unit 230 of the detachable knob 200 may have an attachment means corresponding to the construction of the attachment unit 130 of the integrated manipulation unit 100. A plurality of magnetic bodies 231 disposed at the bottom (the outer bottom or the inner bottom) of the detachable knob 200 so as to have a predetermined pattern may be provided as an example of the attachment means. Each of the magnetic bodies may be made of iron, nickel, cobalt, a magnet, or an alloy thereof. However, the present disclosure is not limited thereto. For example, in the case in which the manipulation unit 220A or 220C shown in FIG. 2(a) or 2(b) is provided and the magnetic bodies 231 are disposed at intervals of 90 degrees (i.e. a "+" pattern), as shown in FIG. 3, the detachable knob 200 may be rotated in the unit of 90 degrees, and thus the manipulation unit 220A or 220C may have a + type disposition form at the time of attachment. In the case in which the magnetic bodies 231 of the detachable knob 200 are disposed as described above, the attachment means of the integrated manipulation unit 100 may be constructed as shown in FIG. 4.

Figure 4:
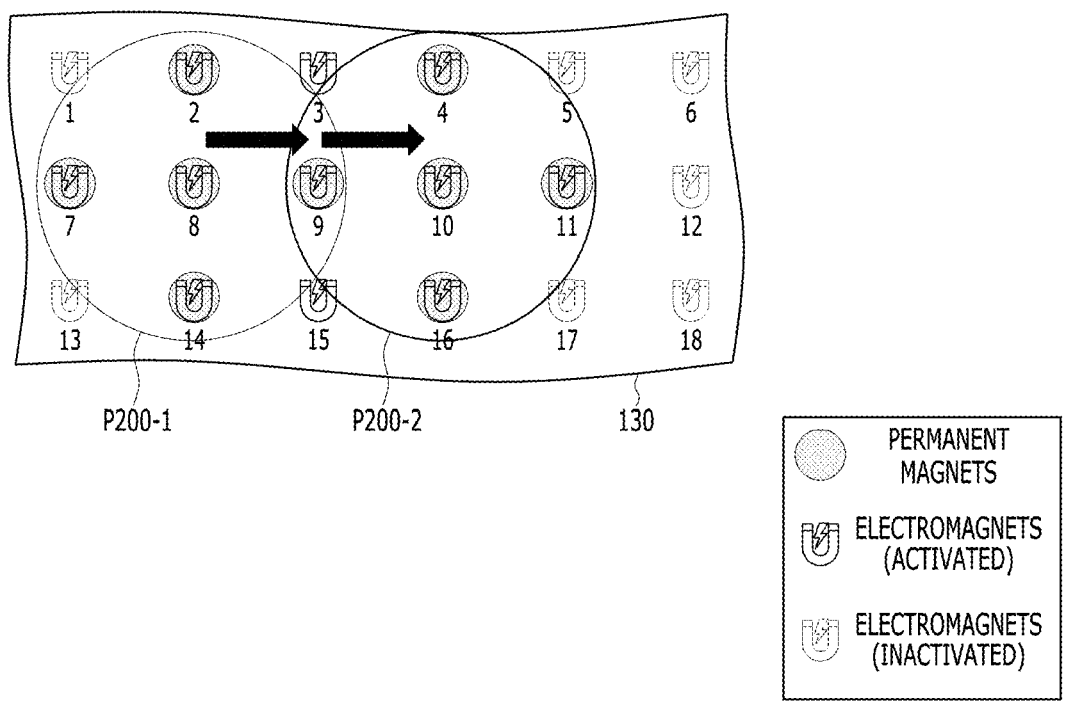
FIG. 4 is a view showing an example of the construction of an attachment unit of an integrated manipulation unit according to an embodiment of the present disclosure.

FIG. 4 is a view showing an example of the construction of an attachment unit of an integrated manipulation unit according to an embodiment of the present disclosure Referring to FIG. 4, the attachment unit 130 of an integrated manipulation unit 100 may include a plurality of electromagnets 1 to 18 arranged in the form of a grid. In other words, the attachment unit 130 shown in FIG. 4 includes 18 electromagnets corresponding to a 3×6 grid, which, however, is illustrative. In some embodiments, the attachment unit 130 may include a larger or smaller number of electromagnets.

Here, activation and polarities of the electromagnets 1 to 18 may be determined in consideration of the disposition pattern of the magnetic bodies 231 of the detachable knob 200. For example, in the case in which the magnetic bodies 231 of the detachable knob 200 have a "+" pattern, as shown in FIG. 3, and are permanent magnets having the same first polarity toward the attachment unit 130, the electromagnets disposed at the attachment unit 130 of the integrated manipulation unit 100 may also have a "+" pattern as a basic activation unit. The electromagnets included in the basic activation unit may be activated so as to have a second polarity, which is opposite to the first polarity, toward the bottom of the detachable knob 200.

Specifically, electromagnets 2, 7, 8, 9, and 14 may correspond to a basic activation unit of the leftmost attachment position P200-1 of the attachment unit 130 having electromagnet 8 as the center. In addition, electromagnets 3, 8, 9, 10, and may correspond to a basic activation unit of a second attachment position from the left having electromagnet 9 as the center. Furthermore, electromagnets 4, 9, 10, 11, and 16 may correspond to a basic activation unit of a third attachment position P200-2 from the left having electromagnet 10 as the center.

Consequently, in the case in which the detachable knob 200 having the magnetic bodies 231 disposed as shown in FIG. 3 is attached to the leftmost attachment position P200-1 and is then moved to the third attachment position P200-2 from the left, the magnetic bodies 231 may be located on the activated electromagnets. The activated electromagnets have the opposite polarity at the second attachment position from the left having electromagnet 9 as the center and thus the user may feel as if the detachable knob 200 were caught once. As a result, the user may feel movement between attachment positions through movement having a distinct feeling without confirmation with the naked eye.

Also, in the case in which the attachment of the detachable knob 200 to an arbitrary attachment position is recognized through an attachment recognition means described below with reference to FIGS. 8(a)-8(c) and then the recognition of the detachable knob 200 at a corresponding attachment position fails, the controller 260 may determine that this is movement of the detachable knob 200 between the attachment positions. The controller 260 may also reduce magnetic force of each activated electromagnet by a predetermined rate for smooth movement between the attachment positions.

Also, in the case in which the number of functions to be controlled currently disposed on the display 120 is three, only basic activation units corresponding to three different attachment positions are activated, and the other electromagnets may be inactivated, as shown in FIG. 4. In the case in which the number of functions to be controlled is four, electromagnets 5, 10, 11, 12, and 17 corresponding to an activation unit having electromagnet 11 as the center may be further activated.

Furthermore, electromagnets that do not correspond to the activation units may be activated so as to have a polarity opposite to the polarity of the activated electromagnets (i.e. a polarity identical to the polarity of the permanent magnets of the detachable knob 200), rather than inactivated. For example, in the case in which electromagnets 1, 5, 13, and 17 are activated so as to have the opposite polarity in FIG. 4, repulsive force may be generated between these electromagnets and the permanent magnets of the detachable knob 200. In the case in which the user attempts to move the detachable knob 200 from the leftmost attachment position P200-1 in the leftward direction, the repulsive force may be generated and thus the user may easily recognize that the user attempts to move the detachable knob in the wrong direction. In some embodiments, the magnets located at the corners (e.g. electromagnets 1, 6, 13, and 18) may be constantly activated so as to have a polarity opposite to the polarity of the electromagnets corresponding to the activation units irrespective of the number of functions displayed on the display 120 or the activation units.

Meanwhile, the magnitude of magnetic force generated between the magnetic bodies 231 of the detachable knob 200 and the electromagnets provided at the attachment unit 130 of the integrated manipulation unit 100 is preferably sufficiently high. Thus, the detachable knob 200 should not be detached from an arbitrary attachment position due to vibration generally generated during driving of the vehicle when being attached to the arbitrary attachment position while being greater than rotational resistance of the dial 210. This is necessary to prevent a phenomenon in which the entirety of the detachable knob 200 is rotated without movement of the dial 210 in the case in which magnetic force is less than rotational resistance when the user rotates the dial 210.

Of course, it should be apparent to those having ordinary skill in the art that the magnitude of magnetic force may be variously changed depending on the weight of the detachable knob 200, the angle between the position at which the detachable knob 200 is attached and the vertical direction in the vehicle, and the rotational resistance of the dial 210.

In the embodiment described previously with reference to FIG. 4, a method of providing feedback between movements, assisting movement, or preventing movement on the condition that the user directly moves the detachable knob 200 has been described. In another embodiment, the electromagnets of the attachment unit 130 may be controlled to automatically move the detachable knob 200. This is described with reference to FIGS. 5(a)-5(c).

Figure 5A:
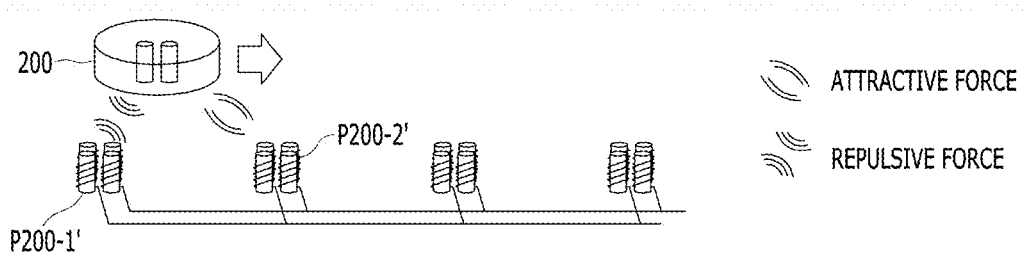
FIGS. 5(a)-5(c) are views showing an example of the form in which the detachable knob is automatically moved from an attachment unit according to an embodiment of the present disclosure.
Figure 5B:
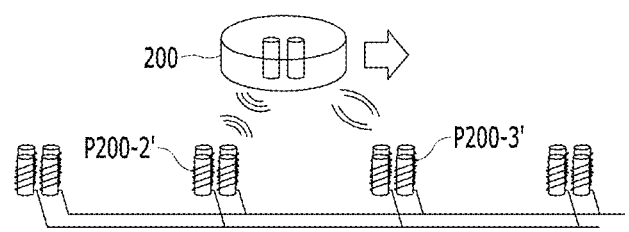
Figure 5C:
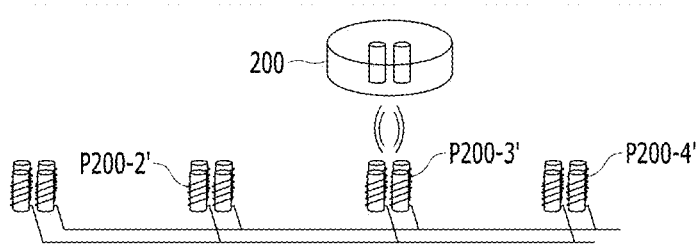

FIGS. 5(a)-5(c) are views showing an example of the form in which the detachable knob 200 is automatically moved from an attachment unit 130 according to an embodiment of the present disclosure. In FIGS. 5(a)-5(c), individual attachment positions are shown as electromagnet units for easy understanding, and the case in which the detachable knob 200 is automatically moved from the leftmost attachment position P200-1' to a third attachment position P200-3' from the left in the rightward direction is assumed. In this embodiment, automatic movement may be performed using a method of alternately changing polarities of electromagnets adjacent to the detachable knob 200 in the target movement direction of the detachable knob 200.

Specifically, referring to FIG. 5(a), in order to move the detachable knob to the right in the state in which the detachable knob 200 is disposed at the leftmost attachment position P200-1', electromagnets corresponding to the leftmost attachment position P200-1' may be controlled to generate repulsive force with respect to the detachable knob 200, and electromagnets corresponding to a second attachment position P200-2' from the left may be controlled to generate attractive force with respect to the detachable knob 200.

Subsequently, when the detachable knob 200 passes by the second attachment position P200-2' from the left, as shown in FIG. 5(b), the electromagnets corresponding to a second attachment position P200-2' from the left may be controlled to generate repulsive force with respect to the detachable knob 200. Electromagnets corresponding to a third attachment position P200-3' from the left may be controlled to generate attractive force with respect to the detachable knob 200.

As a result, when the detachable knob 200 reaches the third attachment position P200-3' from the left, i.e. the target position, as shown in FIG. 5(c), the electromagnets of the attachment positions P200-2' and P200-4' around the target position may be inactivated, and only the electromagnets corresponding to the attachment position P200-3' may be controlled to generate attractive force with respect to the detachable knob 200. Of course, in order to prevent further movement and to achieve more secure fixation, the electromagnets of the attachment positions P200-2' and P200-4' may be controlled to generate repulsive force with respect to the detachable knob 200.

A function that can be realized through such an automatic movement function is described with reference to FIGS. 6(a)-6(d).

FIGS. 6(a)-6(d) are views illustrating an example of a function that can be realized through the automatic movement illustrated in FIGS. 5(a)-5(c).

Figure 6A:
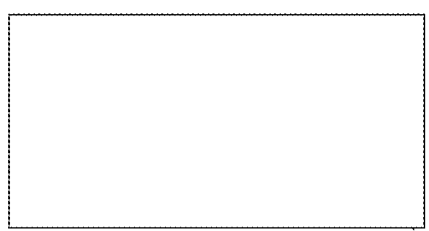
FIGS. 6(a)-6(d) are views illustrating an example of a function that can be realized through the automatic movement illustrated in FIG. 4B.
Figure 6B:
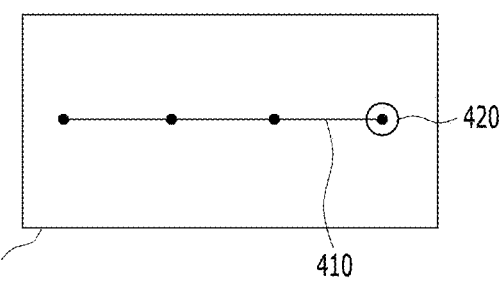

Referring first to FIGS. 6(a) and 6(b), the attachment unit 130 of the integrated manipulation unit 100 remains inactivated in the state in which the vehicle is stalled. When the vehicle is started, the attachment unit 130 may be activated, attachment positions to which the detachable knob 200 can be attached are displayed as point light sources 420, and an automatic movement path of the detachable knob 200 may be disposed as a line light source 410 interconnecting the point light sources 420.

Figure 6C:
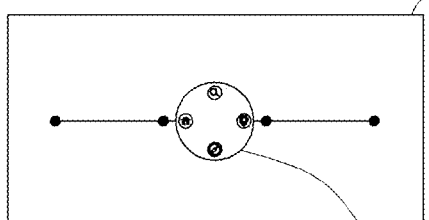
Figure 6D:
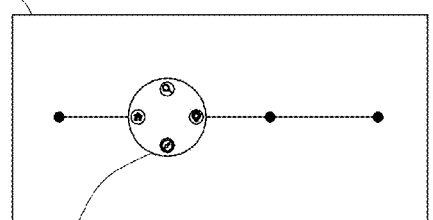
Figure 7A:
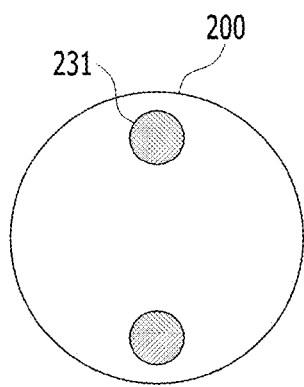
FIGS. 7(a)-7(e) are views showing an example of a disposition form of magnetic bodies for fixing the detachable knob according to the embodiment of the present disclosure.
Figure 7B:
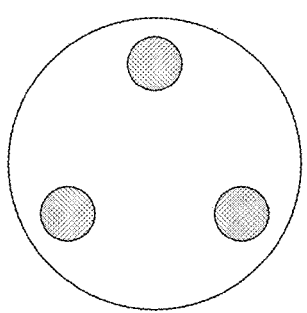
Figure 7C:
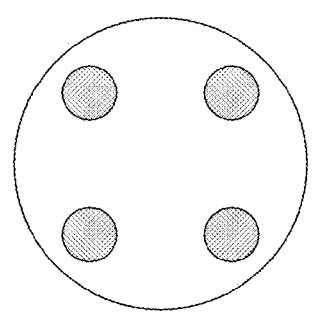
Figure 7D:
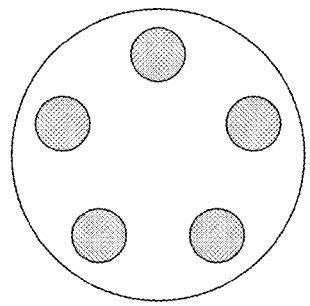
Figure 7E:
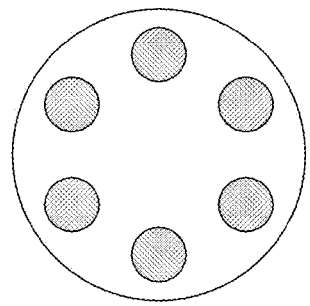

At this time, in the case in which the user attaches the detachable knob 200 to an arbitrary position on the attachment unit 130, as shown in FIG. 6(c), the integrated manipulation unit 100 may sense the position of the detachable knob 200. The integrated manipulation unit 100 may also automatically move the detachable knob 200 to an attachment position set by default, as shown in FIG. 6(d). The attachment position set by default may correspond to a function having the highest frequency of use, may correspond to a function that is selected by the user through predetermined menu manipulation, or may be an attachment position at which the detachable knob 200 was located last before the vehicle is stalled during previous driving. However, the present disclosure is not limited thereto. When the driver inputs a speech command in this state, the detachable knob 200 may be automatically moved to an attachment position corresponding to a function corresponding to the speech command.

Meanwhile, the disposition pattern of the magnetic bodies 231 shown in FIGS. 3 and 4 is illustrative, and the disposition pattern of the magnetic bodies 231 may be variously changed. This is described with reference to FIGS. 7(a)-7(e).

FIGS. 7(a)-7(e) are views showing an example of the disposition form of the magnetic bodies for fixing the detachable knob according to the embodiment of the present disclosure.

In FIGS. 7(a)-7(e), a large circle 200, which commonly corresponds to the planar shape of the detachable knob 200, indicates the attachment position of the detachable knob 200. Small circles 231 indicate disposition positions of the magnetic bodies 231.

In an embodiment, two or more magnetic bodies 231 are provided such that the detachable knob 200 is not rotated by manipulation of the dial 210 after the detachable knob 200 is attached. In addition, the magnetic bodies 231 may be disposed about the center of the attachment position in origin symmetry. This is necessary to assist the detachable knob 200 to be accurately attached to the attachment position when the detachable knob 200 approaches the attachment position. Of course, the position at which the electromagnets are disposed in the attachment position provided at the attachment unit 130 of the integrated manipulation unit 100 and the number of electromagnets may be variously changed so as to correspond to the pattern of the magnetic bodies 231 of the detachable knob 200.

Next, a method for the attachment unit 130 of the integrated manipulation unit 100 to recognize whether the detachable knob 200 has been attached is described with reference to FIGS. 8(a)-8(c). FIGS. 8(a)-8(c) are views illustrating a recognition means for recognizing whether the detachable knob according to the embodiment of the present disclosure has been attached. In FIGS. 8(a)-8(c), it is assumed that the number of attachment positions provided at the attachment unit 130 of the integrated manipulation unit 100 is three and that the attachment unit 130 of the integrated manipulation unit 100 have a recognition means and the attachment unit 230 of the detachable knob 200 have a means to be recognized.

Figure 8A:
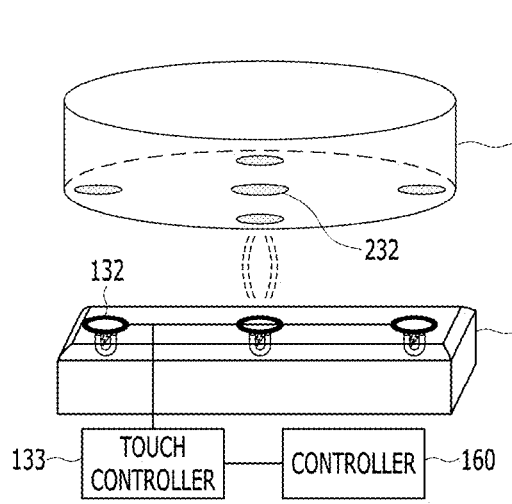
FIGS. 8(a)-8(c) are views illustrating a recognition means for recognizing whether the detachable knob according to the embodiment of the present disclosure has been attached.

Referring first to FIG. 8(a), a conductor 232 may be disposed at the center of the bottom of the detachable knob 200, and a capacitance sensor 132 for sensing a change in capacitance due to approach of the conductor 232 may be provided at each attachment position of the attachment unit 130 of the integrated manipulation unit 100. A touch controller 133 may inform the controller 160 of an attachment position where a change in sensing value of a capacitance sensor 132 occurs among the plurality of capacitance sensors 132. The change corresponds to an attachment position to which the detachable knob 200 is attached.

Figure 8B:
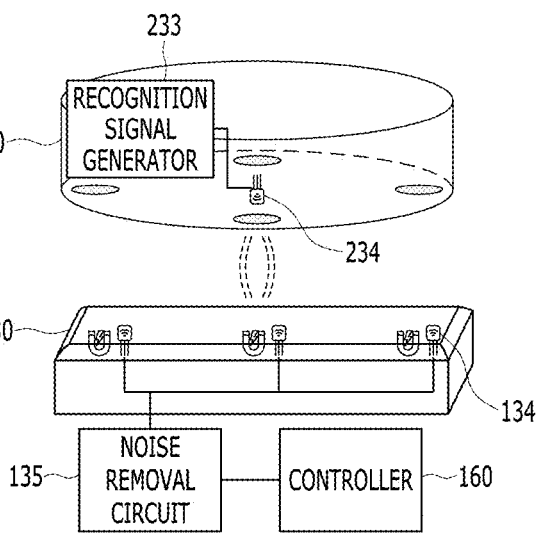

Next, referring to FIG. 8(b), a light emitting device 234 for emitting light in a specific pattern under control of a recognition signal generator 233 may be disposed at the center of the bottom of the detachable knob 200, and a light receiving device 134 for recognizing the light emission pattern of the light emitting device 234 may be provided at each attachment position of the attachment unit 130 of the integrated manipulation unit 100. A noise removal circuit 135 may remove noise of the light receiving devices 134 and may inform the controller 160 of one of the light receiving devices 134 that has sensed a specific light emission pattern such that the controller 160 can determine the attachment position of the detachable knob 200.

Figure 8C:
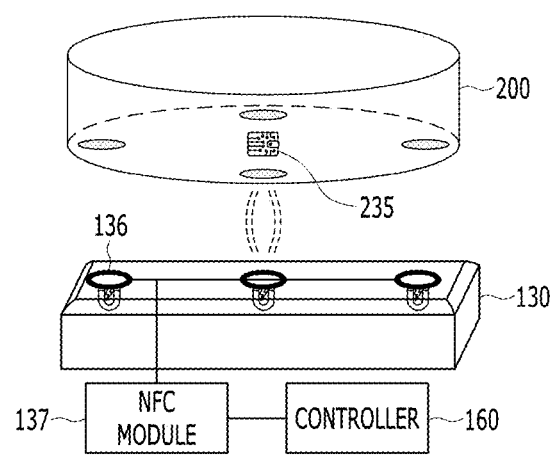

In addition, referring to FIG. 8(c), an NFC tag 235 may be disposed at the center of the bottom of the detachable knob 200, and an NFC antenna 136 may be provided at each attachment position of the attachment unit 130 of the integrated manipulation unit 100. An NFC module 137 may inform the controller 160 of one of the antennas 136 that has sensed the NFC tag 235 such that the controller 160 can determine the attachment position of the detachable knob 200.

Furthermore, although not shown, a Hall sensor may be provided at each attachment position in order to sense the magnetic bodies 231 of the detachable knob 200. Thus, the attachment position of the detachable knob 200 may be determined.

Next, the construction of the power supply 270 of the detachable knob 200 is described with reference to FIGS. 9(a) and 9(b). FIGS. 9(a) and 9(b) are views showing an example of the construction of the power supply of the detachable knob according to the embodiment of the present disclosure.

Referring to FIG. 9(a), power from a replaceable battery 271 may be supplied to respective components of the detachable knob 200, including the controller 260.

In another embodiment, as shown in FIG. 9(b), a wireless charging receiver 273 may be disposed at the center of the bottom of the detachable knob 200, and wireless charging transmitters 131A, 131B, and 131C may be disposed at the respective attachment positions of the attachment unit 130 of the integrated manipulation unit 100, such that power can be supplied to the detachable knob 200 in a wireless charging fashion. In this embodiment, the integrated manipulation unit 100 may determine the attachment position to which the detachable knob 200 is attached based on the position of an activated one of the wireless charging transmitters.

Hereinafter, the external appearance of the attachment unit 130 of the integrated manipulation unit 100 is described with reference to FIGS. 10-12(c).

Figure 10:
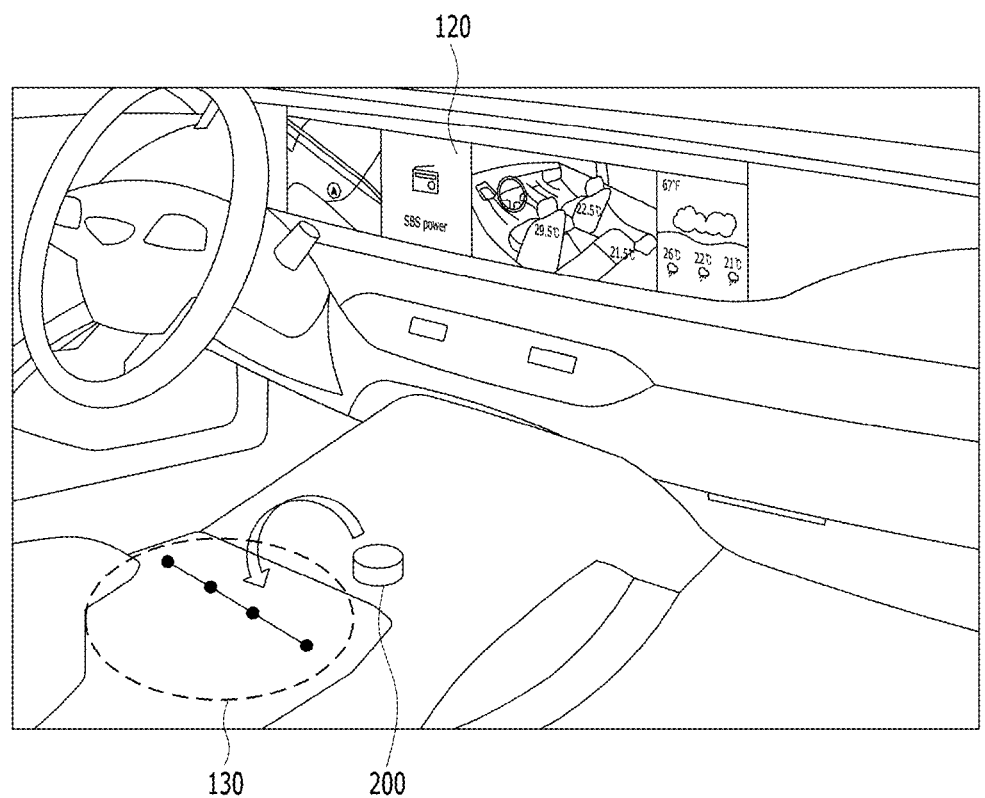
FIG. 10 is a view showing an example of the external appearance of the attachment unit of the integrated manipulation unit according to the embodiment of the present disclosure.
Figure 11A:
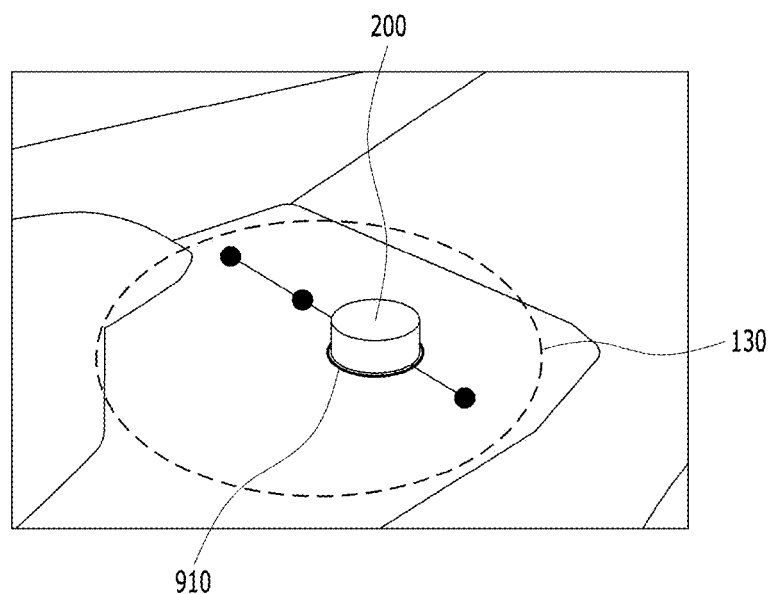
FIGS. 11(a) and 11(b) are views showing an example of the form in which the detachable knob is attached to one of the attachment positions shown in FIG. 10.
Figure 11B:
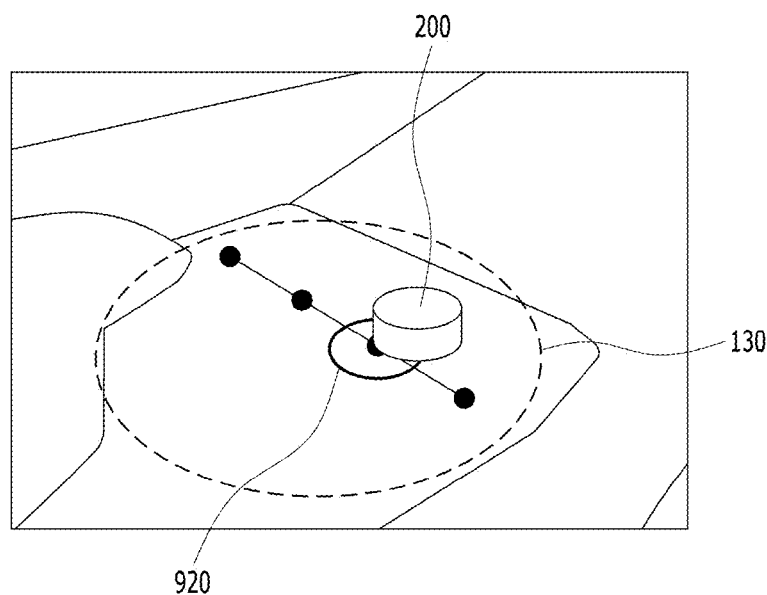

FIG. 10 is a view showing an example of the external appearance of the attachment unit of the integrated manipulation unit according to the embodiment of the present disclosure, and FIGS. 11(a) and 11(b) are views showing an example of the form in which the detachable knob is attached to one of the attachment positions shown in FIG.

10. In FIGS. 10, 11(a) and 11(b), it is assumed that a total of four attachment positions is provided at the attachment unit 130 of the integrated manipulation unit 100.

Referring to FIG. 10, in the case in which a display 120 extending from a cluster to a center fascia area in the horizontal direction is applied to the vehicle, the attachment unit 130 of the integrated manipulation unit 100 may be provided in a center console area such that attachment positions thereof are disposed in a line in the horizontal direction. A point light source may be disposed at each attachment position such that the driver can intuitively recognize the point light source, and a line light source may be disposed between the respective point light sources. Consequently, the driver may attach the detachable knob 200 to one of the point light sources.

When the detachable knob 200 is attached to a third attachment point from the left, as shown in FIG. 11(a), at least one of the light emission range or the light emission intensity of the point light source at the position may be controlled such that a ring-shaped light emission effect 910 may be provided around the bottom of the attached detachable knob 200.

In the case in which the detachable knob 200 deviates from a correct attachment position, e.g. in the case in which signal sensitivity of the attachment recognition means described previously with reference to FIG. 6 is equal to or less than a predetermined level, the point light source corresponding to the attachment position may output a light emission effect 920 different from FIG. 11(a) in terms of at least one of color or shape in order to inform the driver of the attachment position deviation state. Of course, the detachable knob 200 may be automatically moved to an attachment position that is the most adjacent thereto through the automatic movement described with reference to FIGS. 5(a)-5(c).

Meanwhile, the alignment form of the plurality of attachment positions may be changed depending on the display 120, although the description has been given based on the case in which the plurality of attachment positions is aligned in a line in the horizontal direction in FIGS. 10, 11(a), and 11(b). This is described with reference to FIG. 12(a)-12(c).

Figure 12A:
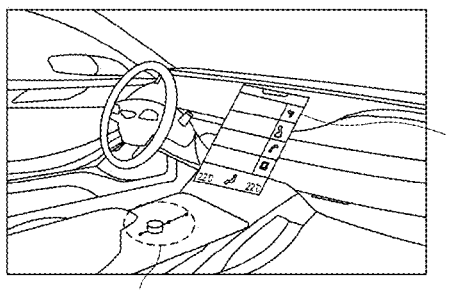
FIGS. 12(a)-12(c) are views showing an attachment position alignment form depending on the shape of a display according to an embodiment of the present disclosure.
Figure 12B:
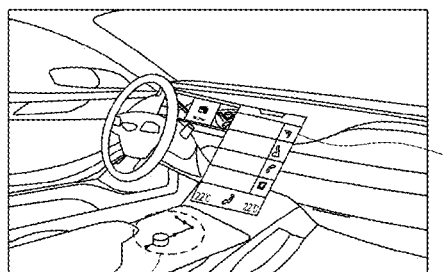
Figure 12C:
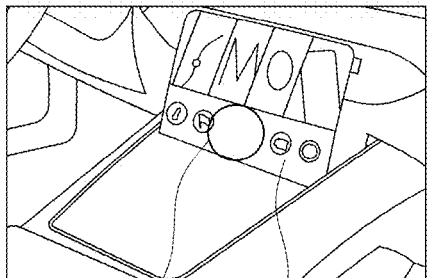

FIGS. 12(a)-12(c) are views showing an attachment position alignment form depending on the shape of a display according to an embodiment of the present disclosure.

Referring first to FIG. 12(a), in a vehicle to which a quadrangular display 120A having a major axis in the vertical direction is applied, attachment positions of an attachment unit 130A may be aligned in a line in the vertical direction.

In another embodiment, in the case in which a bent-straight-line-shaped, e.g. an "L"-shaped, display 120B is applied, as shown in FIG. 12(b), attachment positions of an attachment unit 130B may be aligned in a bent straight line form so as to correspond to the shape of the display 120B.

Also, in the case in which a display 120C of the integrated manipulation unit 100 is provided at the lower end of the center fascia, as shown in FIG. 12(c), attachment positions may be provided at a lower-end center area 130C of the display 120C. In this embodiment, a predetermined display object (e.g. a circular object corresponding to the actual size of a detachable knob 200 displayed on one of the attachment positions) may be displayed at the lower-end center area 130C so as to correspond to the attachment position such that the user can visually recognize the attachment position.

Meanwhile, although not shown, it should be apparent to those having ordinary skill in the art that the attachment positions may be variously changed, for example the attachment positions may be provided on a steering wheel or may be disposed at the middle of the center fascia.

Hereinafter, the form in which an interworking function is performed between the detachable knob and the integrated manipulation unit is described with reference to FIGS. 13(a)-13(c) based on the construction of the apparatus described above.

FIGS. 13(a)-13(c) are views showing an example of the form in which an interworking function is performed between the detachable knob and the display of the integrated manipulation unit according to the embodiment of the present disclosure.

In FIGS. 13(a)-13(c), it is assumed that four functions to be controlled are simultaneously displayed on the display 120 and that navigation, a multimedia player, air conditioning control, and weather information are sequentially disposed from the left. In addition, it is assumed that four different attachment positions are aligned in a line in the horizontal direction at the attachment unit 130 of the integrated manipulation unit 100.

Referring first to FIG. 13(a), when the detachable knob 200 is attached to the leftmost attachment position of the attachment unit 130, an area 1110 displaying a navigation function may be displayed on the display 120 in the state of extending in the horizontal direction. When the dial 210 or the manipulation unit 220 of the detachable knob 200 is manipulated in this state, the navigation function may be controlled.

For example, in the case in which the manipulation unit 220A shown in FIG. 2(a) is provided, the four buttons may be operated as hotkeys for current position, destination search, point of interest (POI), and view change functions from the upper end in the clockwise direction.

When the detachable knob 200 is moved to a second attachment position from the left in this state, as shown in FIG. 13(b), an area 1110' displaying the navigation function on the display 120 may be reduced, and an area 1120 displaying a multimedia player function may be displayed on the display 120 in the state of extending in the horizontal direction. When the dial 210 or the manipulation unit 220 of the detachable knob 200 is manipulated in this state, the multimedia player function may be controlled.

For example, in the case in which the manipulation unit 220A shown in FIG. 2(a) is provided, the four buttons may be operated as hotkeys for search, track, menu, and media source change functions from the upper end in the clockwise direction.

When the detachable knob 200 is moved to a third attachment position from the left in this state, as shown in FIG. 13(c), an area 1120' displaying the multimedia player function on the display 120 may be reduced, and an area 1130 displaying an air conditioning control function may be displayed on the display 120 in the state of extending in the horizontal direction. When the dial 210 or the manipulation unit 220 of the detachable knob 200 is manipulated in this state, the air conditioning function may be controlled.

Meanwhile, in the case in which the attachment positions correspond to different areas on the display 120, the automatic movement function described previously with reference to FIGS. 4-6(d) may be applied to provide a tutorial function. For example, in the case in which the user calls the tutorial function through predetermined menu manipulation, an automatic movement position may be determined according to a current guidance function. In other words, the state in which different areas on the display 120 are activated depending on a change in position of the detachable knob 200 may be intuitively shown to the user through automatic movement of the detachable knob 200.

In the embodiment described above, the movement path of the detachable knob 200 that forms the attachment position is a straight line or a bent line. In another aspect of this embodiment, however, two or more branches may be provided. This is described with reference to FIGS. 14(a)-14(d).

FIGS. 14(a)-14(d) are views showing an example of a function provision form depending on the construction of an attachment unit according to another aspect of the embodiment of the present disclosure.

Figure 14A:
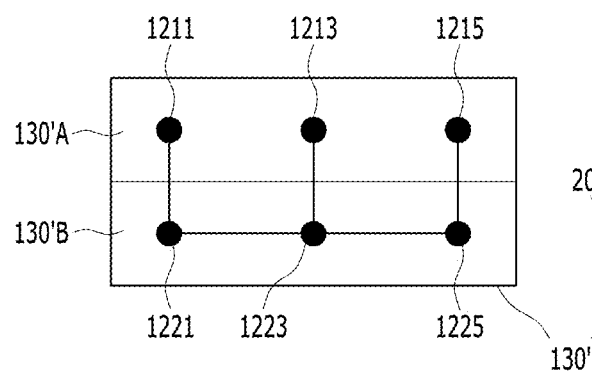
FIGS. 14(a)-14(d) are views showing an example of a function provision form depending on the construction of an attachment unit according to another aspect of the embodiment of the present disclosure.

Referring to FIG. 14(a), an attachment unit 130' according to another aspect of the embodiment of the present disclosure may be divided into an upper area 130'A and a lower area 130'B extending in one direction (here, the horizontal direction). The upper area 130'A and the lower area 130'B may include the same number of attachment positions.

In the lower area 130'B, attachment positions 1221, 1223, and 1225 may be matched with different functions, similarly to the above description. Unlike this, attachment positions 1211, 1213, and 1215 in the upper area 130'A may correspond to sub-functions of the functions matched with the attachment positions 1221, 1223, and 1225 in the lower area 130'B, overlapping the attachment positions 1211, 1213, and 1215 in the vertical direction.

For example, it is assumed that the left attachment position 1221 in the lower area 130'B corresponds to an air conditioning function and the intermediate attachment position 1223 in the lower area 130'B corresponds to multimedia. Also, it is assumed that the left attachment position 1211 in the upper area 130'A corresponds to a ventilation mode, which is one item of the air conditioning function, and the intermediate attachment position 1213 in the upper area 130'A corresponds to a smartphone interworking function, which is one item of the multimedia.

Figure 14B:
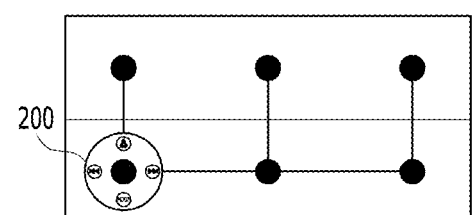
Figure 14C:
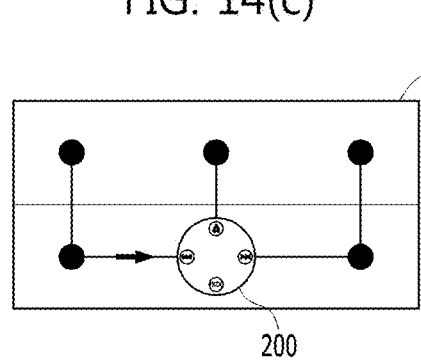
Figure 14D:
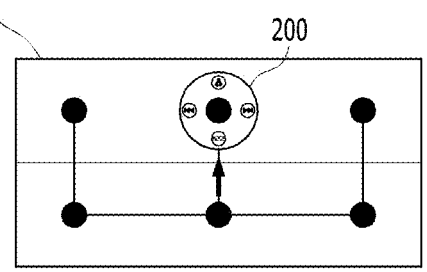

When the user wishes to manipulate the smartphone interworking function in the state in which the detachable knob 200 is currently located at the attachment position 1221 corresponding to the air conditioning function, as shown in FIG. 14(b), on this assumption, the user may move the detachable knob 200 rightwards, as shown in FIG. 14(c), and may then move the detachable knob 200 upwards, as shown in FIG. 14(d). As a result, the user may immediately manipulate the smartphone interworking function.

Of course, it should be apparent to those having ordinary skill in the art that the construction, area division, and corresponding functions of the attachment unit 130' are illustrative; however, the present disclosure is not limited thereto, and various modifications are possible.

Hereinafter, the interworking function shown in FIG. 11 is described with reference to a flowchart of FIG. 15.

Figure 15:
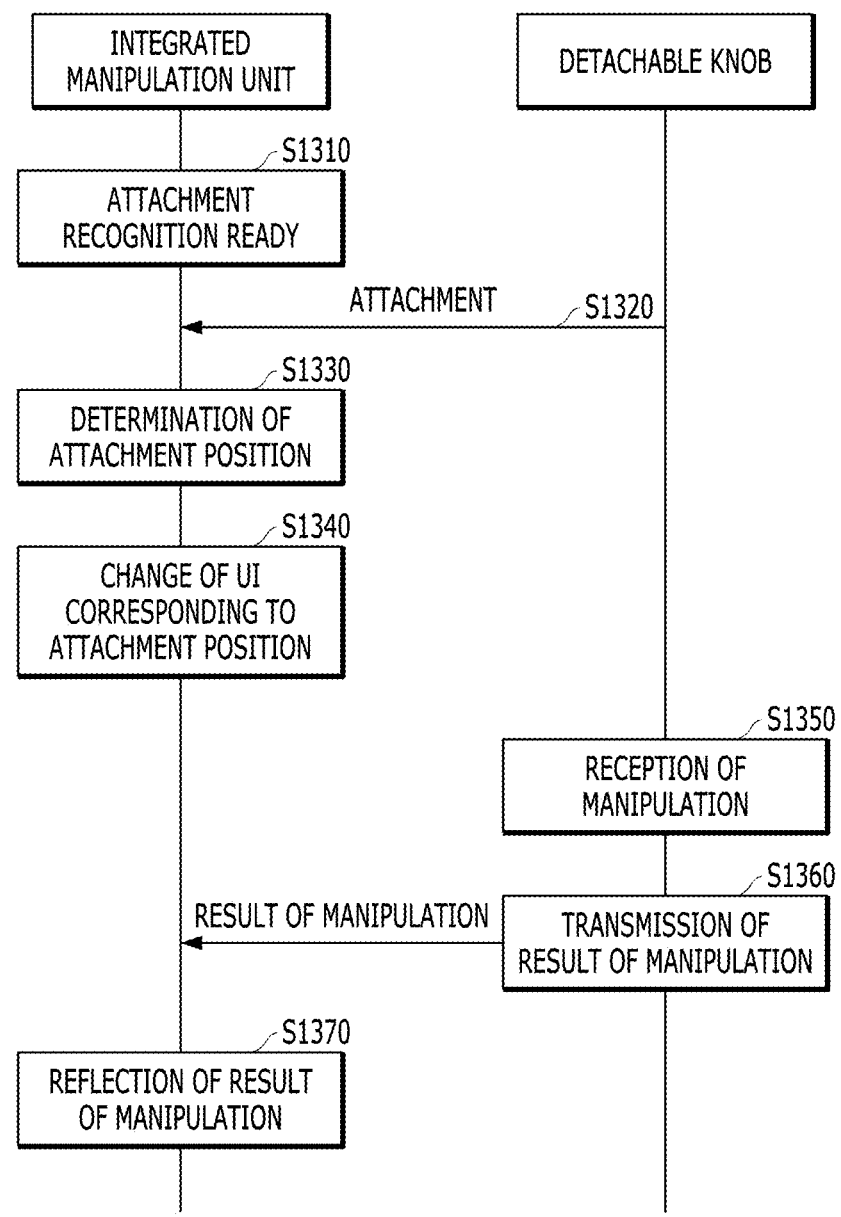
FIG. 15 is a flowchart showing an example of an operation process of the vehicle function control system including the detachable knob according to the embodiment of the present disclosure.

FIG. 15 is a flowchart showing an example of an operation process of the vehicle function control system including the detachable knob according to the embodiment of the present disclosure.

Referring to FIG. 15, the integrated manipulation unit 100 may monitor whether the detachable knob 200 is attached in an attachment recognition ready state (S1310). This state may be entered in the state in which the detachable knob 200 is detached after being attached to an arbitrary attachment area, may be activated in a specific power state (e.g. ACC), and may be activated when a smart key is sensed in the vehicle. However, the present disclosure is not limited thereto. Also, in this step, power may start to be applied to the electromagnets 131 of the attachment unit 130, and other sensing means, such as the touch controller 133, the light receiving devices 134, the noise removal circuit 135, or the NFC module 137, may be activated.

When the detachable knob 200 is attached to one of one or more attachment positions disposed on the attachment unit 130 (S1320), the integrated manipulation unit 100 may sense whether the detachable knob 200 has been attached and may sense the attachment position thereof through the attachment unit 130 (S1330).

The integrated manipulation unit 100 may change at least a portion of the construction of the user interface displayed on the display 120, as described previously with reference to FIG. 11, depending on the attachment position (S1340).

Subsequently, when user manipulation is received, e.g. the dial 210 is manipulated or touch input or a push-type command is input on the manipulation unit 220 (S1350), the detachable knob 200 may transmit information about the manipulation (e.g. a manipulated object, the amount of manipulation, and the manipulation direction) to the integrated manipulation unit 100 through the wireless communication unit 250 (S1360).

The integrated manipulation unit 100 may reflect the result of manipulation in a function to be controlled based on the information about the manipulation received through the wireless communication unit 150 (S1370).

In the above embodiment, the detachable knob 200 has been described as interworking with the display 120 of the integrated manipulation unit 100. However, the present disclosure is not limited thereto. The detachable knob 200 may be attached around a touch panel having no display function in order to constitute a knob for vehicles together with the touch panel.

Meanwhile, in the embodiments described above, the description has been given based on the driver's manipulation environment, such as the center console or the center fascia. In another embodiment of the present disclosure, however, use of the detachable knob 200 by a passenger in the passenger seat or in the back seat may be considered. This is described with reference to FIG. 16.

Figure 16:
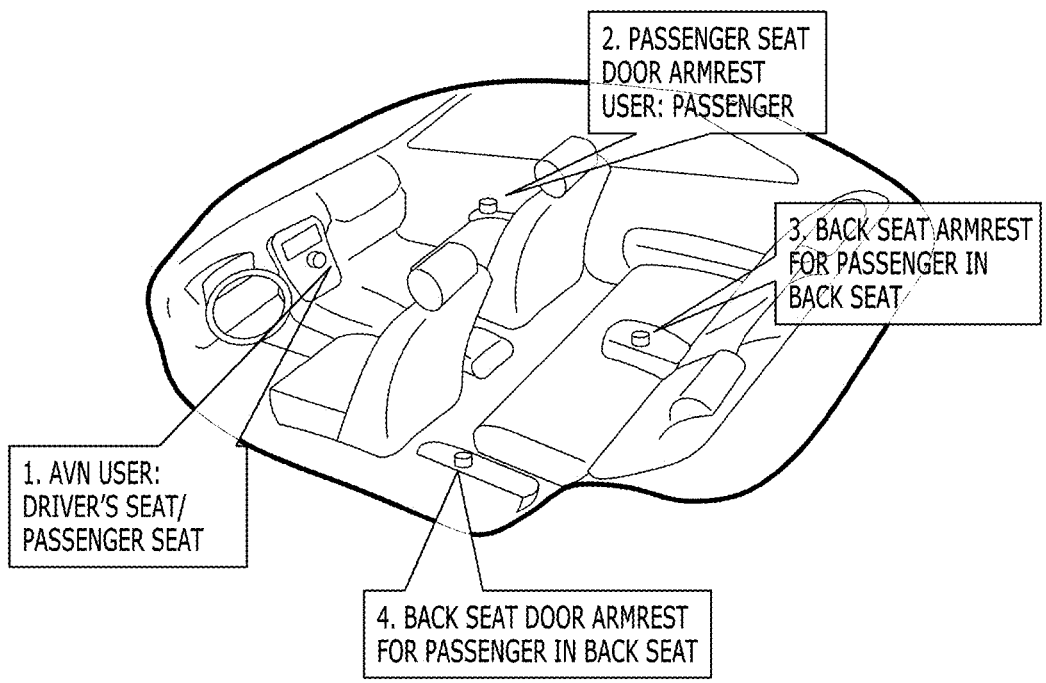
FIG. 16 is a view showing an example of an in-vehicle position of an attachment unit according to another embodiment of the present disclosure.

FIG. 16 is a view showing an example of an in-vehicle position of an attachment unit according to another embodiment of the present disclosure.

Referring to FIG. 16, various positions of the attachment unit are shown. First, the periphery 1 of the audio/video/navigation (AVN) system is similar to what has been described with reference to FIGS. 13(a)-13(c). A passenger seat door armrest 2 for use of a passenger in the passenger seat, a back seat armrest 3 for the user of a passenger in the back seat, and a back seat door armrest 4 for the user of a passenger in the back seat may be considered as other positions of the attachment unit.

In the case in which attachment units are disposed at two or more different positions, as described above, passengers may share a single detachable knob 200. For example, the driver may hand over the detachable knob 200 attached to the periphery 1 of the AVN system to a passenger in the passenger seat, and the passenger may attach the same to the attachment unit located at the passenger seat door armrest 2. In the case in which the same detachable knob 200 is attached to a new attachment unit, the controller 160 of the integrated manipulation unit 100 may perform control such that the function controlled last at the previous attachment unit can be continuously manipulated at the new attachment unit. For example, in the case in which the detachable knob 200 performing the multimedia manipulation at periphery 1 of the AVN system is attached to the back seat armrest 3, the multimedia manipulation may be continuously performed.

In another embodiment, the controller 160 may perform control such that a function set by default by position of the attachment unit, irrespective of the function controlled last at the previous attachment unit or a function controlled last at the new attachment unit, becomes a function to be controlled.

The vehicle control method using the detachable knob according to the embodiments of the present disclosure described above may have the following effects.

First, the degree of freedom in design of the detachable knob and the in-vehicle knob and intuitive usability thereof may be improved due to a reduction of the switch. For example, physical key buttons may be simplified due to the detachable knob. In another example, center fascia/flow console switches may be integrated through function integration.

In addition, usability of the detachable knob is improved, since the detachable knob is attached/detached using magnetic force. In other words, magnetic force is utilized, rather than a mechanical structure for fixing the detachable knob to the attachment area, and thus the detachable knob may be attached to the attachment area simply when the detachable knob approaches the attachment area, which is convenient.

Furthermore, it is not necessary to confirm the degree of manipulation with the naked eye, which is accompanied by forward attention neglect, due to a manipulation sensation provided by a physical dial even when the detachable knob is used during driving.

The present disclosure described above may be implemented as a computer-readable program stored in a computer-readable recording medium. The computer-readable medium may be any type of recording device in which data is stored in a computer-readable manner. The computer-readable medium may include, for example, a hard disk drive (HDD), a solid-state disk (SSD), a silicon disk drive (SDD), a read-only memory (ROM), a random access memory (RAM), a compact disc read-only memory (CD-ROM), a magnetic tape, a floppy disk, and an optical data storage device.

As apparent from the above description, the vehicle function control apparatus according to at least one embodiment of the present disclosure may interwork with the detachable knob. Such a structure provides a more convenient user interface.

In addition, a function to be controlled and a user interface may be conveniently changed depending on the attachment position of the detachable knob.

It should be appreciated by those having ordinary skill in the art that the effects achievable through the present disclosure are not limited to those that have been particularly described hereinabove and that other effects of the present disclosure should be more clearly understood from the above detailed description.

The above detailed description is not to be construed as limiting the present disclosure in any aspect but is to be considered by way of example. The scope of the present disclosure should be determined by reasonable interpretation of the accompanying claims, and all equivalent modifications made without departing from the scope of the present disclosure should be understood as being included in the following claims.

What is claimed is:

1. A vehicle function control method using a detachable knob, the vehicle function control method comprising:
   determining, by an integrated manipulation unit, a target attachment position on an attachment unit having a plurality of attachment positions;
   sensing a position of a detachable knob on the attachment unit, the detachable knob having at least one magnet and a manipulation means;
   controlling a plurality of electromagnets disposed so as to correspond to the plurality of attachment positions such that the detachable knob is moved from the sensed position to the target attachment position, among the plurality of attachment positions; and
   when the detachable knob is moved from one of a plurality of first attachment positions to a second attachment position matched with the one of the plurality of first attachment positions, among a plurality of second attachment positions, in a second direction, determining a predetermined sub-function of a function to be controlled matched with the one of the plurality of first attachment positions as a current function to be controlled,
   wherein the attachment unit comprises a first area and a second area extending in a first direction, the first area and the second area being disposed side by side in the second direction intersecting the first direction,
   wherein the first area has the plurality of first attachment positions disposed in the first direction, the plurality of first attachment positions being matched with different functions to be controlled, and
   wherein the second area has the plurality of second attachment positions disposed in the first direction, the plurality of second attachment positions being matched with the plurality of first attachment positions in the second direction.

2. The vehicle function control method according to claim 1, wherein the target attachment position corresponds to one of a function manipulated last before previous driving is finished, a predetermined default function, and a function corresponding to a speech command.

3. The vehicle function control method according to claim 1, wherein the controlling the plurality of electromagnets comprises alternately changing a polarity of at least one electromagnet adjacent to the detachable knob in a target movement direction of the detachable knob.

4. The vehicle function control method according to claim 2, wherein the controlling the plurality of electromagnets further comprises performing control such that an electromagnet corresponding to the target attachment position has attractive force with respect to the detachable knob in a case in which the detachable knob reaches the target attachment position.

5. The vehicle function control method according to claim 4, wherein the controlling the plurality of electromagnets further comprises performing control such that at least one electromagnet adjacent to the electromagnet corresponding to the target attachment position has repulsive force with respect to the detachable knob.

6. The vehicle function control method according to claim 1, wherein the target attachment position is changed according to a current guidance function of a tutorial function.

7. The vehicle function control method according to claim 1, wherein
   the detachable knob has a cylindrical external appearance, and
   the manipulation means comprises at least one of a key button disposed at a top surface of the detachable knob, a touch pad, or a ring-shaped dial wrapping the top surface of the detachable knob.

8. A non-transitory computer readable recording medium containing a program for performing the vehicle function control method according to claim 1.

9. A vehicle function control apparatus using a detachable knob, the vehicle function control apparatus comprising:
- a detachable knob having at least one magnet and a manipulation means; and
- an integrated manipulation unit configured to sense a target attachment position on an attachment unit having a plurality of attachment positions, to sense a position of the detachable knob on the attachment unit, and to control a plurality of electromagnets disposed so as to correspond to the plurality of attachment positions such that the detachable knob is moved from the sensed position to the target attachment position, among the plurality of attachment positions;
- wherein the attachment unit comprises a first area and a second area extending in a first direction, the first area and the second area being disposed side by side in a second direction intersecting the first direction,
- wherein the first area has a plurality of first attachment positions disposed in the first direction, the plurality of first attachment positions being matched with different functions to be controlled,
- wherein the second area has a plurality of second attachment positions disposed in the first direction, the plurality of second attachment positions being matched with the plurality of first attachment positions in the second direction, and
- wherein, when the detachable knob is moved from one of the plurality of first attachment positions to a second attachment position matched with the one of the plurality of first attachment positions, among the plurality of second attachment positions, in the second direction, the integrated manipulation unit determines a predetermined sub-function of a function to be controlled matched with the one of the plurality of first attachment positions as a current function to be controlled.

10. The vehicle function control apparatus according to claim 9, wherein the target attachment position corresponds to one of a function manipulated last before previous driving is finished, a predetermined default function, and a function corresponding to a speech command.

11. The vehicle function control apparatus according to claim 9, wherein the integrated manipulation unit alternately changes a polarity of at least one electromagnet adjacent to the detachable knob in a target movement direction of the detachable knob.

12. The vehicle function control apparatus according to claim 10, wherein the integrated manipulation unit performs control such that an electromagnet corresponding to the target attachment position has attractive force with respect to the detachable knob in a case in which the detachable knob reaches the target attachment position.

13. The vehicle function control apparatus according to claim 12, wherein the integrated manipulation unit performs control such that at least one electromagnet adjacent to the electromagnet corresponding to the target attachment position has repulsive force with respect to the detachable knob.

14. The vehicle function control apparatus according to claim 9, wherein the target attachment position is changed according to a current guidance function of a tutorial function.

15. The vehicle function control apparatus according to claim 9, wherein
- the detachable knob has a cylindrical external appearance, and
- the manipulation means comprises at least one of a key button disposed at a top surface of the detachable knob, a touch pad, or a ring-shaped dial wrapping the top surface of the detachable knob.

* * * * *